US010389595B2

(12) United States Patent
Houyou et al.

(10) Patent No.: US 10,389,595 B2
(45) Date of Patent: Aug. 20, 2019

(54) CONTROLLER AND METHOD FOR CONTROLLING COMMUNICATION SERVICES FOR APPLICATIONS ON A PHYSICAL NETWORK

(71) Applicant: Siemens Aktiengesellschaft, Munich (DE)

(72) Inventors: Amine Mohamed Houyou, Munich (DE); Hans-Peter Huth, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 729 days.

(21) Appl. No.: 14/373,254

(22) PCT Filed: Jan. 25, 2013

(86) PCT No.: PCT/EP2013/051401

§ 371 (c)(1),
(2) Date: Jul. 18, 2014

(87) PCT Pub. No.: WO2013/110742

PCT Pub. Date: Aug. 1, 2013

(65) Prior Publication Data

US 2014/0372617 A1 Dec. 18, 2014

(30) Foreign Application Priority Data

Jan. 26, 2012 (EP) .................................... 12000488

(51) Int. Cl.
*G06F 15/173* (2006.01)
*H04L 12/24* (2006.01)
*H04L 29/08* (2006.01)

(52) U.S. Cl.
CPC ............ *H04L 41/12* (2013.01); *H04L 41/145* (2013.01); *H04L 41/50* (2013.01); *H04L 41/5054* (2013.01); *H04L 67/10* (2013.01)

(58) Field of Classification Search
CPC ... H04L 41/145; H04L 41/12; H04L 41/5054; H04L 41/50; H04L 67/10
(Continued)

(56) References Cited

U.S. PATENT DOCUMENTS 6,973,477 B1 * 12/2005 Martino ................ G06Q 20/00
348/E7.081
7,310,673 B2 * 12/2007 Zhu .......................... G06F 9/50
709/226

(Continued)

FOREIGN PATENT DOCUMENTS

CN 102334111 1/2012
WO WO 2011/007105 1/2011

OTHER PUBLICATIONS

Seaman, M., A Mulitiple VLAN Registration Protocol (MVRP), May 9, 2004, 4 pages.

(Continued)

*Primary Examiner* — David R Lazaro
*Assistant Examiner* — Mariegeorges A Henry
(74) *Attorney, Agent, or Firm* — Cozen O'Connor

(57) ABSTRACT

A method, computer program product and controller for controlling communication services for a plurality of applications on a physical network having a plurality M of network nodes providing certain network resources, wherein each of the applications is described by a set of requirements and is configured to run on at least two of the network nodes. The controller includes a generator and a calculator. The generator generates a network model of the physical network including a topology of the physical network and a node model for each of the network nodes, where the node model describes node capabilities and node resources of the network node. The calculator calculates virtual networks for the applications by mapping each respective set of requirements of the applications to the generated network model, (Continued)

where each of the calculated virtual networks includes at least two network nodes and a slice of the certain network resources.

17 Claims, 3 Drawing Sheets

(58) Field of Classification Search
USPC .................................................. 709/226, 224
See application file for complete search history.

(56) References Cited

U.S. PATENT DOCUMENTS

| | | | | |
|---|---|---|---|---|
| 9,106,540 | B2 | 8/2015 | Cohn et al. | |
| 2003/0120780 | A1* | 6/2003 | Zhu | G06F 9/50 709/226 |
| 2006/0026276 | A1* | 2/2006 | Kroger | H04L 41/08 709/223 |
| 2006/0031444 | A1* | 2/2006 | Drew | H04L 41/12 709/223 |
| 2008/0005368 | A1* | 1/2008 | Kreiner | G06F 13/385 710/8 |
| 2009/0228541 | A1* | 9/2009 | Barsness | G06F 9/5077 709/201 |
| 2010/0246443 | A1 | 9/2010 | Cohn et al. | |
| 2011/0258317 | A1 | 10/2011 | Sinha et al. | |
| 2012/0324044 | A1* | 12/2012 | Aranda Gutierrez | H04L 45/04 709/217 |
| 2013/0179140 | A1* | 7/2013 | Sharma | G06F 17/509 703/13 |
| 2015/0350011 | A1 | 12/2015 | Cohn et al. | |

OTHER PUBLICATIONS

Teener et al. "Standards-based Audio Networks Using IEEE 802.1 AVB", 2008, 38 pages.

White Paper, Network Services Virtuelization, Cisco Inc., 2009, http//www.cisco.com/en/US/prod/collateral/switches/ps5718/ps4324/white_paper_c11-531522.pdf; 2009.

White Paper. IEEE 802.1ak—MVRP and MRP, Cisco Inc., Mar. 2009, IEEE802.1ak—MVRP and MRP [6] P. Frieden, VLANs on Linux, Linux Journal, Mar. 2004, http//www.linuxjournal.com/article/7268?page=0,2; 2004.

Enc W. Biedermann, Multiple Instances of the Global Linux Namespaces, proceedings of the Linux symposium, vol. One, Jul. 19th�22nd, 2006. Ottawa, Ontario, Canada.

W. Maurer, Professional Linux® Kernel Architecture, Wiley Publishing, Inc., USA, 2008, ISBN: 978-0-470-34343-2,.

S. Shenker, C. Partridge, R. Guerin, "Specification of Guaranteed Quality of Service", RFC 2212, Sep. 1997.

L. Westberg, A. Csaszar, G. Karagannis, A. Marquetant, D. Pertain, O. Pop, V. Rexhepi, R. Szabo, A. Takacs, "Resource management in DiffServ (RMD) � A Functionality and Performance Behaviour Overview", Proceedings of the 7thIFIP/IEEE International Workshop on Protocols for High Speed Networks, Springer-Verlag London, UK, 2002.

N. McKeown, T. Anderson, H. Balakrishnan, G. Paruikar, L. Peterson, J. Rexford, S. Shenker, J. Turner, OpenFlow: Enabling Innovation in Campus Networks, White Paper, Mar. 2008, www.openflow.org/.

The GENI Project Office, the Genii System Overview, Document ID: GENISE-SY-SO-02.0, Sep. 29. 2008, Cambridge, US, www.geni.net.

Hammad A. et al; "A Novel Framework for IP Infrastructure Virtualization"; Computer Science and Electronic Engineering Conference (CEEC), 2012 4th, IEEE; pp. 184-189; ISBN: 978-1-4673-2665-0; DOI: 10.1109/CEEC.2012.6375402; XP032276739; 2012; Sep. 12, 2012.

Davy S. et al; "Policy-Assisted Planning and Deployment of Virtual Networks"; Network and Service Management (CNSM), 2011 7th international Conference on, IEEE; pp. 1-8, ISBN: 978-1-4577-1588-4; XP032073582; 2011; Oct. 24, 2011.

Office Action dated Aug. 3, 2016 which issued in the corresponding Chinese Patent Application No. 201380006828.1.

* cited by examiner

CONTROLLER AND METHOD FOR CONTROLLING COMMUNICATION SERVICES FOR APPLICATIONS ON A PHYSICAL NETWORK

REFERENCE TO RELATED APPLICATIONS

This is a U.S. national stage of application No. PCT/EP2013/051401 filed 25 Jan. 2013. Priority is claimed on European Application No. 12000488.2 filed 26 Jan. 2012, the content of which is incorporated herein by reference in its entirety.

BACKGROUND OF THE APPLICATION

1. Field of the Invention

The present invention relates communication networks and, more particularly, to a controller and a method for controlling communication services for applications on a physical network.

2. Description of the Related Art

Many networks particularly require a predictable operation with precise timings and a high level of reliability. This is especially true for industrial networks. In this regard, "industrial network" preferably refers to Ethernet/IP-based networks in factory automation, traffic control, machine-to-machine, Supervisory control and data acquisition (SCADA) application areas.

Current internet and local area network technologies cannot fulfill those requirements. Many conventional technical extensions in the form of industrial communication standards try to solve these issues, such as the PROFINET standard. Basically, for all of these standards, the same steps have to apply. In a first step, the applications have to be planned. In a second step, requirements have to be derived. In a third step, the network has to be planned. In a fourth step, the network has to be rolled out and configured. In a fifth step, the network has to be started for providing the applications.

One problem with this procedure is the lack of flexibility under tight coupling of the application planning in network configuration and operation. If something changes in the physical network or in one of the applications, at least some of the steps have to be repeated. This may create extra costs due to manual re-planning. Further, this may be error-prone. Furthermore, it may be hard to use non-industrial technologies as a base for products in industrial networks. In particular, the evolution of standard Internet/LAN technologies is difficult to be integrated within an industrial communication technology such as PROFINET. One of these reasons is the required development costs in terms of hardware, like application specific integrated circuits (ASICs), such as the case within PROFINET. Any technological improvement in the Institute of Electrical and Electronic Engineers (IEEE) standard Ethernet requires large development costs to integrate this extension within PROFINET. Further, this might lead to several generations of the same protocol that potentially cannot interoperate. In addition, the effect of a change on the standard might snow-ball, because PROFINET covers not only networking issues, but also end-devices, middleware and engineering tools that interact with the PROFINET-capable devices and networks. In addition, mixing products from different standards, with sometimes very different capabilities in the same network, is typically difficult or not possible because conventional planning tools cannot work with heterogeneous standards.

A further problem is the fact that many applications from different stack holders may compete for resources and have to be shielded from each other for security and management reasons (multi-tenancy). The share of the network allocated to each application has to be done on-demand and without physically extending the network. The service that the network provides to the applications has to provide guarantees on the one hand, but it also shall enforce restrictions (policy control).

Further, quality of service, resilience and routing/forwarding has to be managed in the physical network.

For each above-discussed partial problem, separate technology developments exist in the Internet and local area networks.

The present partial solutions within the industrial fields may be categorized into the following:

1) Use of different physical networks. This approach, while still commonly used, provides no flexibility and creates extra costs for hardware.

2) The use of virtualization combined with over-dimensioning of the network by setting up a pre-defined and static series of subnets and LANs around a given application (e.g., a control application of a factory cell). This cellular approach also may be less effective neither in allowing inter-cell communication nor in enabling rational network deployment.

3) Industrial extensions to Ethernet protocols to include needs of industrial communication. This solution, however, lacks flexibility, is not suited for interoperability, and has created specialized niche products that have evolved as standalone standards such as Profinet. Those industrial standards typically cannot shield non-industrial applications from each other and must use other means as described in publication [2] to do so.

4) Traffic engineering and Quality of Service (QoS) dimensioning of the network, which is the approach often found in telecommunication networks and used by internet service providers. This allows a certain control over the owned network that is providing communication as a service to multiple tiers. This approach is, however, not as appropriate to the industrial applications, due to the granularity and complexity in defining Service Level Agreements (SLAs) for each user. This approach is also based on some protocols and specified for larger hardware (such as routers supporting RSVP, or MPLS switches). Thus, existing technologies cannot be used for industrial networks, here.

Conventional methods and devices for controlling communication services for applications on a physical network are described in publications [1] to [14].

SUMMARY OF THE INVENTION

It is therefore an object of the present invention to provide improved control of communication services for applications on a physical network.

In accordance with a first embodiment, a controller for controlling communication services for a plurality N of applications on a physical network having a plurality M of network nodes providing certain network resources is provided. Each of the N applications is described by at least a set of requirements and optionally a set of traffic patterns and is configured to run on at least two of the M network nodes. The controller comprises a generator and a calculator. The generator is configured to generate a network model of the physical network including a topology of the physical network and a node model for each of the M network nodes, where the node model describes node capabilities and node resources of the network node. The calculator is configured to calculate N virtual networks for the N applications by mapping each of the set of requirements of the N applications to the provided network model, where each of the N calculated virtual networks includes at least two network nodes and a slice of the certain network resources.

By calculating the virtual networks based on the provided network model, the planning of the physical network and its configuration are advantageously separated. Thus, the efficiency of the physical network may be improved.

Thus, in the step of calculating the virtual networks it is not necessary to have and use information that identifies how to interface the respective network element. The present controller adds intelligence to optimize and manage the network resources on the fly and not just by offline traffic engineering. The result is a managed portioning of the network, with clear service guarantees and associated policies, called “virtual network” or “slice”. “Portioning” here refers not only the route data packets can take, as in traditional network virtualisation techniques, but also the share of network resource they can consume. Network resources include bandwidth, schedulers and buffers.

The physical network includes its connected network elements, such as end devices and inner nodes, as well as their interconnecting physical links. For example, the physical network is a set of IP and/or OSI layer-2 devices (i.e., routers or switches) interconnected by physical links that can route messages (packets) and can apply constraints on those messages.

Here, virtual network corresponds to “slice” preferably referring to a logical partition of the physical network connecting several end points and characterized by a class. A slice can exist in several instances of unconnected slices. The class of slice is defined through a distinctive attribute or set of attributes that distinguish different classes, such as security, QoS parameters, importance, and reliability. A slice instance is instantiated by defining the members of the slice in terms of end points, and the characteristics of the network that fulfills the slice as class attributes. The slice may be implemented as the virtual network fulfilling the characteristic of the slice class independently of the underlying network or technology used to fulfill those characteristics. A slice instance has an identifier, such as a number.

“Application” preferably refers to pieces of software or programs distributed across the physical network (distributed service). The software may be considered as a set of end points with the need to communicate with a certain service level over at least one pipe (slice).

“End point” preferably refers to the leaf of a slice. The end point suggests a distributed nature of the application, which could be peer-to-peer or client-server based, where each application peering end entity is hosted at a different edge of the physical network. Each end point may run as a “virtual end point” (VEP), such as a virtual machine or virtual entity, where a single device can host several VEPs and each VEP belongs to a different slice.

“Pipe” preferably refers to a connection of two end points. It’s a logical connection meaning on the first glance it has nothing to do with routing/forwarding and other properties on the physical layer. A pipe has properties, such as minimum or maximum bandwidth, and access is controlled.

“Network model” preferably refers to an abstraction of the concrete physical network using generic nodes but various properties. The generic nodes are preferably described as node models.

In this context, a communication service is the functionality to transport information between endpoints in a network with certain properties. Functionality includes routing respective data forwarding, properties are non-functional issues, such as performance or resilience.

The set of requirements of each application preferably defines the network elements on which the application has to be run and further the paths or path requirements that have to be used.

Thus, in accordance with specific embodiments, a plurality of network elements, i.e., end devices and inner nodes, and/or network architectures may be handled easily.

In accordance with certain embodiments, because of the present separation of planning and configuring the physical network, an ability to support multi-tier and remote access to a shared production system is provided, i.e., by installing virtual networks on demand. Virtual networks may preferably be called slices, because each of the calculated virtual networks uses a definite slice of the certain network resources of the present physical network.

In particular compared to conventional virtualization techniques, no communication overhead due to direct node configuration occurs. Thus, there is no need for encapsulation.

Moreover, in accordance with other embodiments, it is possible to provide holistic QoS and routine approaches targeted at industrial communication networks.

Further, the calculated N virtual networks may provide a slice application view of the physical network, where the slice application view gathers a list of network elements configured to run at least one application, as well as entry points into the slice. The slice application view may be seen as a graph of an overlay, where each node is a slice end-point, with a given interface describing the expected communication service at each respective interface. This abstract view of expected interfaces is part of the present network model. The interface expected at each endpoint of a slice may describe more than QoS parameters such as bandwidth or expected end-to-end delay, but also at some semantics information such as the need for a secure channel, redundant communication, or other requested non-functional qualities of the network. The semantic model may also include the capabilities of the said interface, such as protocols, physical resources, ability to support QoS or policy enforcements. The present abstraction of the physical network, i.e., the network model, enables technology independent planning and engineering tools.

Network elements and applications may be slice system aware, i.e., they contain components that can interact with the present controller. The present controller may be also called slice manager or slice controller. If devices are not slice system aware, the first slice system aware device in the physical network may terminate the slice system and transparently route all traffic for this device. If an application is not slice system aware, but is placed on a slice system aware device, then this device may contain an additional software component that manages slice access on behalf of that application.

In accordance with an embodiment, the controller includes a configurator for configuring the physical network such that the calculated N virtual networks are fulfilled.

With the configurator, the controller has the ability to configure the physical network based on the calculated virtual networks advantageously. Thus, in sum, the present controller may perform the following tasks: communicate with applications or management stations in order to establish, tear-down or change the virtual networks or to provide a notification of the occurrence of failures or changes, automatic management of the available physical resources, and device configurations to enable quality-of-service or policing rules.

In accordance with a further embodiment, the configurator is configured to configure the physical network by allowing a separate configuration and a separate commissioning for each of the N applications.

By allowing separate configuration and commissioning steps for each application, a dynamic communication is set up and operation is advantageously supported, while each of the applications are shielded from each another.

In accordance with a further embodiment, the calculator is configured to calculate the N virtual networks such that the N applications are shielded against each other.

If the applications are shielded against each other, one of the applications may be changed without any impact to the other applications.

In accordance with a further embodiment, the controller is configured to control the communication services during an operation of the physical network.

Because the present controller is configured to control the communication services during the operation of the physical network, an application or a network element may be changed while the operation of the physical network is not stopped and a new network model may be calculated and configured to the present physical network. Thus, there is provided an ability to deal with network physical extensions, resource reallocation, for example, due to sudden failures or errors, hidden from the application planning and commissioning.

In accordance with a further embodiment, the controller includes M drivers for driving the M network nodes dependent on the N calculated virtual networks and independent on a certain technology used by one of the N network nodes.

With the M drivers, the controller has the ability to configure a virtual network (slice) along nodes (network elements) with different technologies, such as router, AVB (audio-video-bridging)-capable switch, PROFINET-switch, or managed switch. The slice could cross the different network nodes, while guaranteeing at least the minimum guarantee of the simplest node along the path. The different network nodes may be configured on the fly through whatever interface is appropriate. This requires no additional hardware or firmware extension of the network node itself. Thus, the above discussed slice view is an abstraction of the concrete physical network. This slice view is an abstraction layer between the applications view and the view of the physical network itself.

In accordance with a further embodiment, the node model includes Quality of Service (QoS) capabilities, performance parameters, implementation parameters and/or interfaces of the network node.

In accordance with yet a further embodiment, the calculator is configured to map the N sets of requirements of the N applications to the provided network model by using at least one optimization step.

By optimizing the mapping and therefore the calculation of the virtual networks, the use of the underlined physical network may be improved.

In accordance with a still further embodiment, the controller includes a user interface for planning and configuring the N applications.

In sum, the presently contemplated controller may provide an interface for planning tools and applications, on the one hand, and interfaces towards the network elements, on the other hand.

In accordance with a further embodiment, the controller includes a requestor for requesting network information on the network resources from the physical network and node information on the node capabilities and the node resources from at least one of the M network nodes, i.e., from all of the M network nodes.

The controller, via the requestor, may request the necessary information from the physical network to provide an optimal network model.

In accordance with yet another embodiment, the generator is configured to generate the network model based on the network information and the node information requested by the requestor.

In accordance with still a further embodiment, the physical network is an industrial network, in particular an Ethernet/IP-based industrial network, such as PROFINET.

In accordance with a further embodiment, the M network nodes include a number of end devices that are configured to run at least one of the N applications and a number of inner nodes that are configured to forward data packets between at least two end devices.

In accordance with other embodiments, the controller runs slices from backend systems, such as cloud, enterprise networks, or remote service providers, deep into the field level crossing multiple network borders, while still protecting critical applications and their communication services.

The respective means, e.g., the generator, the calculator or the configurator, may be implemented in hardware and/or in software. If the means are implemented in hardware, the generator may comprise a device, e.g., as a computer or as a processor or as a part of a system, such as a computer system. If the means are implemented in software it may comprises a computer program product, a function, a routine, program code or as an executable object.

It should be understood that any embodiment of the first embodiment may be combined with any embodiment of the first embodiment to obtain another embodiment of the first embodiment.

It is also an object of the invention to provide a method for controlling communication services for a plurality N of applications on a physical network having a plurality M of network nodes providing certain network resources is provided. Each of the N applications is described by a set of requirements and configured to run on at least two of the M network nodes. In a first step, a network model of the physical network is generated, where the network model includes a topology of the physical network and a node model for each of the M network nodes. In particular, the node model describes node capabilities and node resources of the network node. In a second step, N virtual networks for the N applications are calculated by mapping each of the set of requirements of the N applications to the provided network model, where each of the N calculated virtual networks includes at least two network nodes and a slice of the certain network resources.

It is also an object of the invention to provide a computer program product comprising program code for executing the above discussed method for controlling communication services for a plurality N of applications on a physical network when run on at least one computer.

A computer program product, like a computer program means, may be comprise a memory card, USB stick, CD-ROM, DVD or a file that may be downloaded from a server in a network. For example, this may be provided by transferring the respective file with the computer program product from a wireless communication network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further objects, features and advantages of the present invention will become apparent from the subsequent description and depending claims, taking in conjunction with the accompanying drawings, in which:

DETAILED DESCRIPTION OF THE EXEMPLARY EMBODIMENTS

Figure 1:
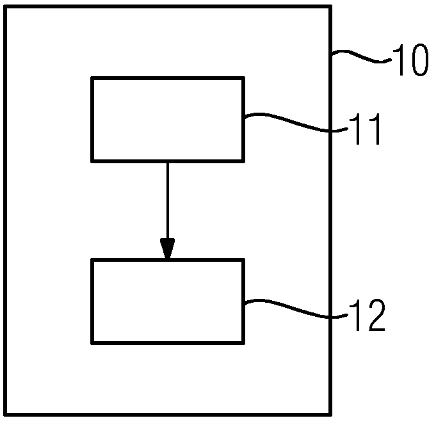
FIG. 1 shows a schematic block diagram of a first embodiment of a controller for controlling communication services for applications on a physical network in accordance with the invention.

In the Figures, like reference numerals designate like or functionally equivalent elements, unless otherwise indicated.

Figure 4:
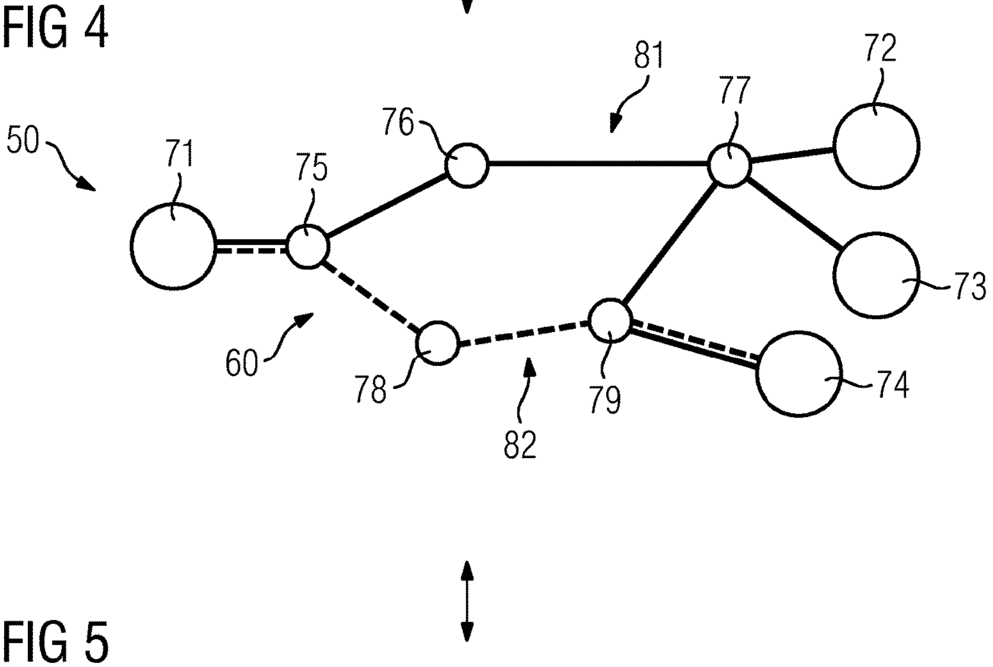
FIG. 4 shows a network model of the physical network of FIG. 5.
Figure 5:
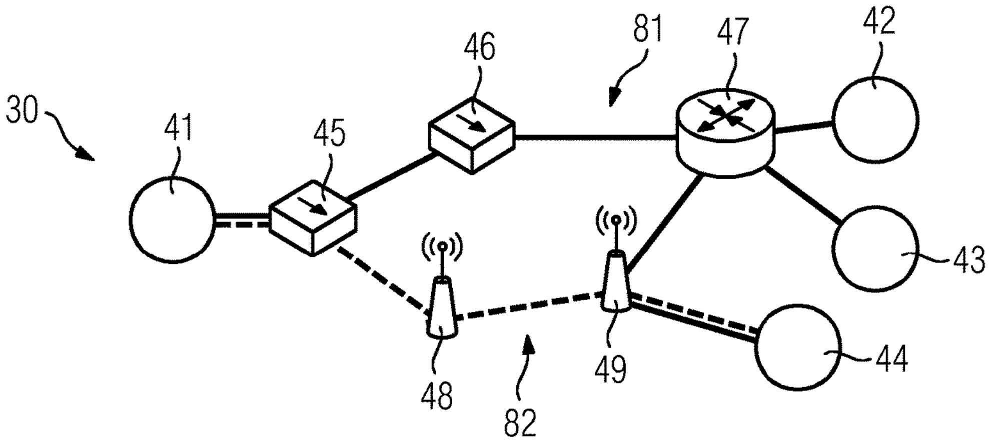
FIG. 5 shows an embodiment of a physical network in accordance with the invention.

FIG. 1 shows a schematic block diagram of a first embodiment of a controller 10 for controlling communication services for a plurality N of applications 21, 22 on a physical network 30 having a plurality M of network nodes 41-49 providing certain network resources. Each of the N applications 21, 22 is described by a set of requirements and is configured to run on at least two of the M network nodes 41-49. In the following, the controller 10 of FIG. 1 is discussed with reference to FIGS. 3 to 5. In this regard, FIG. 5 shows an embodiment of a physical network 30, FIG. 4 a network model 50 of the physical network 30 of FIG. 5, and FIG. 3 shows two exemplary applications 21, 22 that are to be implemented in the physical network of FIG. 5.

Figure 3:
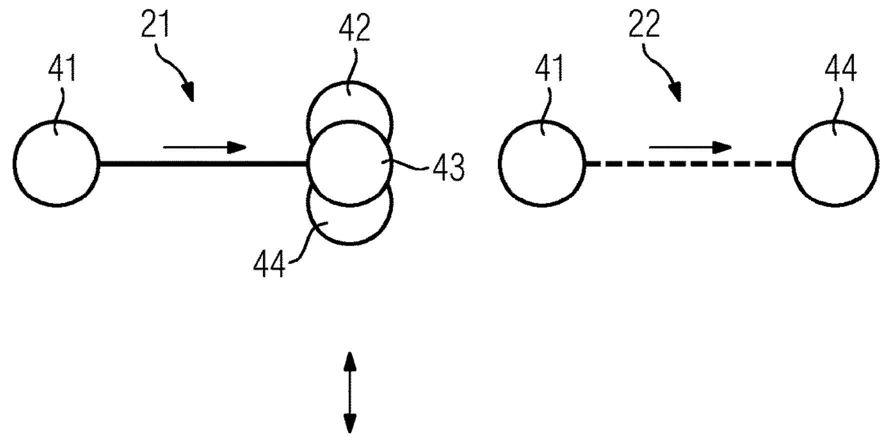
FIG. 3 shows two exemplary applications that are to be implemented in the physical network of FIG. 5.

With respect to FIG. 3, and without loss of generality, N=2 in this example. Further, with reference to FIGS. 4 and 5, M=9 without loss of generality.

FIG. 3 shows two applications 21, 22, where the first application 21 has four end devices 41-44 between which data packets are to be, transferred. In contrast, the second application 22 has only two end devices 41 and 44 between which data packets are to be transferred. According to FIG. 5, the physical network 30 has nine network elements 41-49. The nine network elements 41-49 include four end devices 41-44 that are configured to run at least one of the applications 21, 22 and five inner nodes 45-49 that are configured to forward data packets between the end devices 41-44. The inner nodes 45-59 may comprise bridges, switches or radio stations.

Returning to the controller 10 of FIG. 1, the controller 10 comprises a generator 11 and a calculator 12. The generator 11 is configured to generate the network model 50 according to FIG. 4 of the physical network 30 of FIG. 5. The generated network model 50 includes a topology 60 of the physical network 30 and a node model 71-79 for each of the nine network nodes 41-49 of the physical network 30 of FIG. 5. The respective network model 71-79 describes node capabilities and node resources of the respective network node 41-49. In other words, for each of the network nodes 41-49 of FIG. 5 one respective node model 71-79 is generated.

The calculator 12 of the controller 10 is configured to calculate two (N=2) virtual networks 81, 82 for the two applications 21, 22 by mapping each of the sets of requirements of the two applications 21, 22 to the provided network model 50. Therein, each of the two calculated virtual networks 81, 82 includes at least two network nodes 41-49 and a slice of the certain network resources. In particular, the sum of the slices corresponds to the available network resources of the physical network 30.

Particularly, the calculator 12 is configured to map the two sets of requirements of the two applications 21, 22 to the provided network model 50 by applying at least one optimization step. Further, the calculator 12 may calculate the two virtual networks 81, 82 such that the applications 21, 22 are shielded against each other.

The controller 10 is further configured to control the communication services during an operation of the physical network 30. That means that, for example, one application 21, 22 may be configured or one of the network nodes 41-49 may be changed, the controller 10 may generate a new network model 50 and may calculate new virtual networks 81, 82 dependent on such a change.

Figure 2:
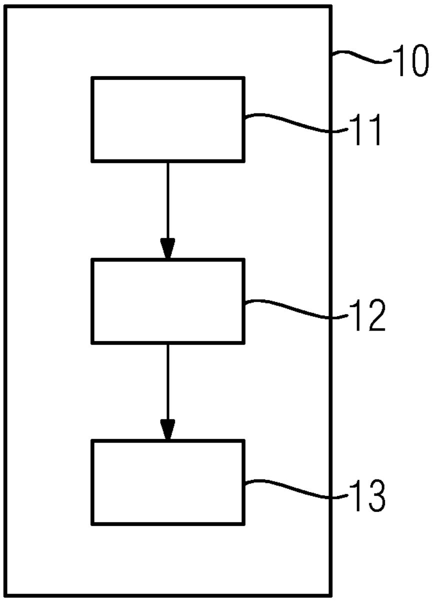
FIG. 2 shows a schematic block diagram of a second embodiment of a controller for controlling communication services for applications on a physical network in accordance with the invention.

FIG. 2 shows a second embodiment of a controller 10 for controlling communication services for a plurality N of applications 21, 22 on a physical network 30 having a plurality M of network nodes 41-49 providing certain network resources. The currently contemplated embodiment of the controller 10 of FIG. 2 is based on the first embodiment of FIG. 1. Additionally to FIG. 1, the controller 10 of FIG. 2 includes a configurator 13 which is configured to configure the physical network 30 such that the calculated two virtual networks 81, 82 are fulfilled. That is, after the configuration step, the physical network 30, in particular its network elements 41-49, is configured to provide the calculated virtual networks 81, 82. Further, the configurator 13 may be configured to configure the physical network 30 by allowing a separate configuration and a separate commissioning for each of the two applications 21, 22.

Figure 6:
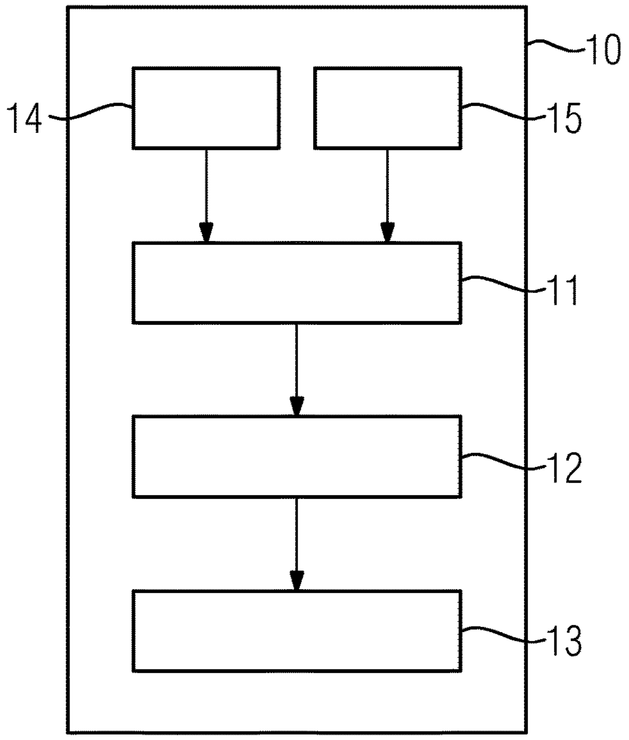
FIG. 6 shows a schematic block diagram of a third embodiment of a controller for controlling communication services for applications on a physical network in accordance with the invention.

Moreover, in FIG. 6, a third embodiment of a controller 10 is depicted which is based on the second embodiment of FIG. 2.

The controller 10 of FIG. 6 additionally comprises a user interface 14 and a requestor 15. Further, the configurator 13 of FIG. 6 comprises a number M of drivers.

A user may plan and configure the N applications 21, 22 via the user interface 14.

The M drivers are configured to drive the M network nodes 41-49 dependent on the N calculated virtual networks 81, 82 and independent on a certain technology used by one of the network nodes 41-49. That is, because of using the drivers 13, any technology can be used for network nodes 41-43, which has no impact on calculating the virtual networks 81, 82.

Moreover, the requestor 15 is configured to request network information on the network resources from the physical network 30 and node information on the node capabilities and the node resources from the network nodes 41-49. In this third embodiment, the generator 30 may be configured to generate the network model 50 based on the network information and the node information as requested by the requestor 15.

Figure 7:
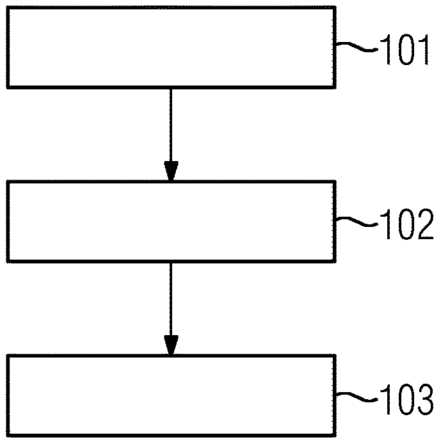
FIG. 7 shows an embodiment of a sequence of method steps for controlling communication services for applications on a physical network in accordance with the invention.

FIG. 7 shows a method for controlling communication services for a plurality N of applications 21, 22 on the physical network 30 having a plurality M of network nodes 41-49 providing certain network resources. Each of the N applications 21, 22 is described by a set of requirements and is configured to run on at least two of the M network nodes 41-49.

The method of FIG. 7 includes the following steps 101-103:

In step 101, a network model 50 of the physical network 30 is generated. The network model 50 includes a topology 60 of the physical network 30 and a node model 71-79 for each of the M network nodes 41-49 (see FIGS. 3-5). In this regard, the node model 71-79 describes node capabilities and node resources of the network node 41-49.

In step 102, N virtual networks 81, 82 for the N applications 21, 22 are calculated by mapping each of the sets of requirements of the N applications 21, 22 to the provided network model 50. Each of the N calculated virtual networks 81, 82 includes at least two network nodes 41-49 and the slice of the certain network resources.

In step 103, the physical network 30 is configured such that the calculated N virtual networks 81, 82 are fulfilled.

In particular, the above-described steps 101-103 may be executed during the operation of the physical network 30.

The following example may illustrate the present invention. In this example, the controller may also be called slice manager and the respective virtual network may be called slice.

In the present example, the following prerequisites are fulfilled:

1. The slice manager knows the network topology. This can be assured via a prepared configuration or by automatic discovery.
2. All devices (network elements) which have to be controlled by the slice manager must be known; if the respective information is not given in 1., the devices register with the slice manager. The information for a device includes QoS capabilities, performance parameters, interfaces and eventually more implementation specific information.
3. For each desired slice (VN) a description exists that includes a list of end devices, applications on those end devices (for slice system aware devices only), QoS requirements, and some notion of importance and/or resilience requirements. Optionally, a specification of the traffic assumed for this slice may exist to allow better optimizations. Another optional description may contain security related issues, i.e., firewall rules, access rules, and upper limits of bandwidth usage.

The following steps have to then be performed to create and use a slice:

1. Some instance triggers slice creation by sending a message to the slice manager containing a slice description as described in the prerequisites.
2. The slice manager starts an algorithm to find an optimal mapping of the slice requirements to the actual network taking device capabilities, available resources, topology and slice requirements and assumed slice traffic into account. If resource conflicts occur, those may be resolved using the importance properties. The mapping process also includes the identification of "inner" slice nodes, which is, finding an optimal path between the slice ends.
3. The slice manager now configures all nodes participating in that slice as well as all inner nodes to perform data forwarding with the desired QoS constraints.
4. If end devices are slice aware, they will create a virtual network interface used as a slice entry by the respective applications.

Although the present invention has been described in accordance with preferred embodiments, it is obvious for a person skilled in the art that modifications are possible in all embodiments.

Thus, while there have been shown, described, and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCES

[1] M. J. Teener, R. Boatright, M. X. Mora, Standards-based Audio networks using IEEE 802.1 AVB, Whitepaper, Broadcom Inc, 2008, AVBforAES-200810.pdf

[2] Design Patterns: Elements of Reusable Object-Oriented Software by Erich Gamma, Richard Helm, Ralph Johnson, and John Vlissides, ISBN 978-0201633610, ISBN 0-201-63361-2, Addison Wesley Professional, Nov. 10, 1994

[3] White Paper, Network Services Virtualization, Cisco Inc., 2009, http://www.cisco.com/en/US/prod/collateral/switches/ps5718/ps4324/whitepaper_c11-531522.pdf

[4] M. Seaman, A Multiple VLAN Registration Protocol (MVRP), IEEE, May 2004, http://ieee802.org/1/files/public/docs2004/MVRP-Introduction-030.pdf

[5] White Paper, IEEE 802.1ak—MVRP and MRP, Cisco Inc., March 2009, IEEE802.1ak—MVRP and MRP [6] P. Frieden, VLANs on Linux, Linux Journal, March 2004, http://www.linuxjournal.com/article/7268?page=0,2

[7] Eric W. Biedermann, Multiple Instances of the Global Linux Namespaces, proceedings of the Linux Symposium, Volume One, Jul. 19-22, 2006, Ottawa, Ontario, Canada

[8] W. Maurer, Professional Linux® Kernel Architecture, Wiley Publishing, Inc., USA, 2008, ISBN: 978-0-470-34343-2,

[9] S. Shenker, C. Partridge, R. Guerin, "Specification of Guaranteed Quality of Service", RFC 2212, September 1997

[10] L. Westberg, A. Csaszar, G. Karagannis, A. Marquetant, D. Partain, O. Pop, V. Rexhepi, R. Szabo, A. Takacs, "Resource management in DiffSery (RMD)—A Functionality and Performance Behaviour Overview", Proceedings of the 7th IFIP/IEEE International Workshop on Protocols for High Speed Networks, Springer-Verlag London, UK, 2002

[11] N. McKeown, T. Anderson, H. Balakrishnan, G. Parulkar, L. Peterson, J. Rexford, S. Shenker, J. Turner, Open-Flow: Enabling Innovation in Campus Networks, White Paper, March 2008, www.openflow.org/[12]

[12] The GENI Project Office, The GENI System Overview, Document ID: GENISE-SY-SO-02.0, Sep. 29, 2008, Cambridge, US, www.geni.net

The invention claimed is:

1. A controller for controlling communication services for a plurality of applications on a physical network having a plurality of network nodes providing certain network resources to increase operational efficiency of the physical network, each application of the plurality of applications being described by a set of requirements and being configured to run on at least two network nodes of the plurality of network, the controller comprising:

a processor including memory, said processor generating a network model of the physical network including a topology of the physical network and a node model for each network node of the plurality of network nodes, the node model describing node capabilities and node resources of each of the plurality of network nodes;

a calculator executed by the processor which calculates virtual networks for the plurality of applications by mapping each respective set of requirements of the plurality of applications to the generated network model to separate planning of the physical network from a configuration of the physical network such that the operational efficiency of the physical network is increased by providing an ability to support multi-tier and remote access to a shared production system, each of the N calculated virtual networks including said at least two network nodes and a slice of the certain network resources; and drivers executed by the processor which drive the plurality of network nodes dependent on the calculated virtual networks and independent from a certain technology used by one network node of the plurality of network nodes.

2. The controller of claim 1, further comprising: a configurator which configures the physical network such that the calculated virtual networks are fulfilled.

3. The controller of claim 2, wherein the configurator configures the physical network by allowing a separate configuration and a separate commissioning for each of the applications.

4. The controller one of claim 1, wherein the calculator calculates the virtual networks such that the plurality of applications are shielded against each other.

5. The controller of claim 4, wherein the controller controls the communication services during an operation of the physical network.

6. The controller of claim 1, wherein the node model includes at least one of Quality of Service (QoS) capabilities, performance parameters, implementation parameters and interfaces of the network node.

7. The controller of claim 1, wherein the calculator maps the sets of requirements of the plurality of applications to the generated network model by using at least one optimization step.

8. The controller of claim 1, further comprising: a user interface for planning and configuring the plurality of applications.

9. The controller of claim 1, further comprising: a requestor which requests network information on the network resources from the physical network and node information on the node capabilities and the node resources from at least one network node of the plurality of M network nodes.

10. The controller of claim 9, wherein the generator generates the network model based on the network information and the node information requested by the requestor.

11. The controller of claim 1, wherein the node information on the node capabilities and the node resources are collected from all network node of the plurality of network nodes.

12. The controller of claim 1, wherein the physical network is an industrial network.

13. The controller of claim 12, wherein the industrial network is an Ethernet/IP-based industrial network.

14. The controller of claim 13, wherein the Ethernet/IP-based industrial network is PROFINET.

15. The controller of claim 1, wherein the plurality of network nodes include a number of end devices which run at least one application of the plurality of applications and a number of inner nodes which forward data packets between at least two end devices.

16. A method for controlling communication services for a plurality of applications on a physical network having a plurality of network nodes providing certain network resources to increase operational efficiency of the physical network, each application of the plurality of applications being described by a set of requirements and being configured to run on at least two network nodes of the plurality of network nodes, the method comprising:

generating a network model of the physical network including a topology of the physical network and a node model for each network node of the plurality of network nodes, the node model describing node capabilities and node resources of the plurality of network nodes;

calculating virtual networks for the plurality of applications by mapping each respective set of requirements of the plurality of applications to the generated network model to separate planning of the physical network from a configuration of the physical network such that the operational efficiency of the physical network is increased by providing an ability to support multi-tier and remote access to a shared production system, each of the calculated virtual networks including at least two network nodes and a slice of the certain network resources; and driving the plurality of network nodes dependent on the calculated virtual networks and independent from a certain technology used by one network node of the plurality of network nodes.

17. A non-transitory computer product encoded with computer program code for executing on a processor which, when used on at least one computer, causes the processor to control communication services for a plurality of applications on a physical network having a plurality of network nodes providing certain network resources to increase operational efficiency of the physical network, the computer program comprising:

program code for generating a network model of the physical network including a topology of the physical network and a node model for each network node of a plurality of network nodes, the node model describing node capabilities and node resources of the plurality of network nodes;

program code for calculating virtual networks for the plurality of applications by mapping each respective set of requirements of the plurality of applications to the generated network model to separate planning of the physical network from a configuration of the physical network such that the operational efficiency of the physical network is increased by providing an ability to support multi-tier and remote access to a shared production system, each of the calculated virtual networks including at least two network nodes and a slice of the certain network resources; and program code for driving the plurality of network nodes dependent on the calculated virtual networks and independent from a certain technology used by one network node of the plurality of network nodes.

* * * * *